(12) United States Patent
Ito et al.

(10) Patent No.: US 7,906,928 B2
(45) Date of Patent: Mar. 15, 2011

(54) FEED MOTOR LOCK DETECTION DEVICE

(75) Inventors: Yuji Ito, Kyoto (JP); Takashi Fujimura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 439 days.

(21) Appl. No.: 12/045,865

(22) Filed: Mar. 11, 2008

(65) Prior Publication Data

US 2008/0224650 A1    Sep. 18, 2008

(30) Foreign Application Priority Data

Mar. 12, 2007  (JP) ................................. 2007-061234
Jan. 28, 2008  (JP) ................................. 2008-015835

(51) Int. Cl.
*H02P 3/00* (2006.01)

(52) U.S. Cl. .................. 318/459; 318/500; 318/400.32; 388/923; 388/928.1

(58) Field of Classification Search .................. 318/459, 318/500, 400.32, 400.34, 400.35; 388/923, 388/928.1
See application file for complete search history.

(56) References Cited

U.S. PATENT DOCUMENTS

| | | | | |
|---|---|---|---|---|
| 4,916,370 A | * | 4/1990 | Rowan et al. | 318/368 |
| 5,017,846 A | * | 5/1991 | Young et al. | 318/244 |
| 5,382,889 A | * | 1/1995 | Peters et al. | 318/400.06 |
| 5,936,365 A | * | 8/1999 | Li et al. | 318/400.24 |
| 6,861,817 B2 | * | 3/2005 | Pigott et al. | 318/685 |
| 2003/0117100 A1 | | 6/2003 | Pigott et al. | |

FOREIGN PATENT DOCUMENTS

| | | |
|---|---|---|
| CN | 1615576 | 5/2005 |
| JP | 11-328887 | 11/1999 |
| JP | 2000-067437 | 3/2000 |
| JP | 2000-173205 | 6/2000 |

* cited by examiner

Primary Examiner — Rina I Duda
(74) Attorney, Agent, or Firm — Fish & Richardson P.C.

(57) ABSTRACT

A feed motor lock detection device detects a back-electromotive voltage in a feed motor M and checks whether the feed motor M is in a driven state or in a non-driven state based on the level of the back-electromotive voltage.

6 Claims, 8 Drawing Sheets

[DRIVEN/NON-DRIVEN DETECTION ON FEED MOTOR ACCORDING TO INVENTION]

[CONVENTIONAL ROTATION RATE DETECTION ON SPINDLE MOTOR]

FEED MOTOR LOCK DETECTION DEVICE

This application claims priority based on the following Japanese Patent Applications, the contents of both of which are hereby incorporated by reference:

(1) Japanese Patent Application No. 2007-061234, filed on Mar. 12, 2007; and
(2) Japanese Patent Application No. 2008-015835, filed on Jan. 28, 2008.

BACKGROUND OF THE INVENTION

1. Field of the Invention

The present invention relates to a lock detection device for checking whether a feed motor is in a driven state or in a non-driven state.

2. Description of Related Art

In optical disc drive apparatuses, there is conventionally used a mechanical switch or a photosensor switch as means for detecting whether a feed motor has moved a pickup until it hits a movement limit position (the innermost or outermost edge of an optical disc) (see, for example, JP-A-2000-173205, JP-A-H11-328887, and JP-A-2000-067437).

Certainly, with conventional optical disc drive apparatuses mentioned above, it is possible to detect a pickup having reached a movement limit position with the eventual aim to stop a feed motor.

Inconveniently, however, in conventional optical disc drive apparatuses mentioned above, the use of a mechanical switch or a photosensor switch results in increased component costs and increased size of a product's circuit board. In addition, in a case where a mechanical switch is used, extra attention needs to be paid to mechanical variations among individual pickups; in a case where a photosensor switch is used, extra attention needs to be paid to variations in the amount of laser light and in the amount of reflected light. These factors make it difficult to attain desired settings.

The inconveniences mentioned above are experienced not only in optical disc drive apparatuses but in products employing a feed motor in general.

SUMMARY OF THE INVENTION

In view of the conventionally encountered inconveniences mentioned above, it is an object of the present invention to provide a lock detection device that can detect whether a feed motor is in a driven state or in a non-driven state with no increase in component costs or in the size of a product's circuit board.

To achieve the above object, according to one aspect of the invention, a lock detection device is so configured as to detect a back-electromotive voltage in a feed motor and check whether the feed motor is in a driven state or in a non-driven state based on the level of the back-electromotive voltage.

According to another aspect of the invention, a lock detection device is so configured as to detect a back-electromotive voltage in a feed motor and check whether the feed motor is in a driven state or in a non-driven state based on whether or not a polarity change has occurred in the back-electromotive voltage.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Figure 1:
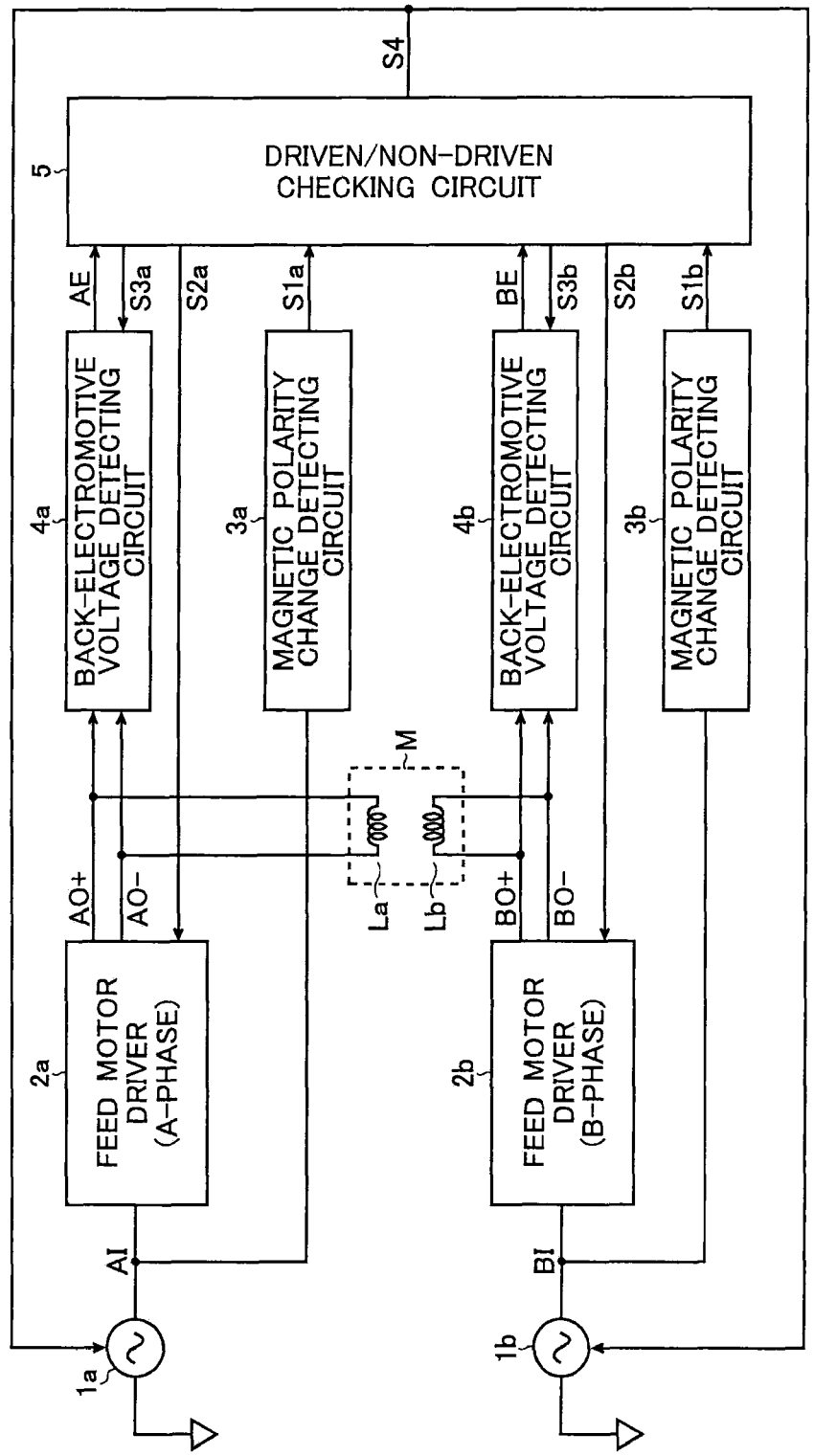
FIG. 1 is a block diagram showing, as one embodiment of the invention, an electric appliance incorporating a feed motor lock detection device according to the invention.

FIG. 1 is a block diagram showing, as one embodiment of the invention, an electric appliance (any of products employing a feed motor in general, such as DVD drive apparatuses, CD drive apparatuses, Blu-ray disc drive apparatuses, car audio products, and camcorders) incorporating a feed motor lock detection device according to the invention.

As shown in FIG. 1, the electric appliance of the embodiment has a feed motor M, input signal generating circuits 1a and 1b, and feed motor drivers 2a and 2b, and further has, as a lock detection device for checking whether the feed motor M is in a driven state or in a non-driven state, magnetic polarity change detecting circuits 3a and 3b, back-electromotive voltage detecting circuits 4a and 4b, and a driven/non-driven checking circuit 5.

The feed motor M is a two-phase feed motor (which may be a DC motor or a stepping motor) having an A-phase motor coil La and a B-phase motor coil Lb. One end of the motor coil La is connected to a first output terminal (at which an A-phase output signal AO+ appears) of the feed motor driver 2a. The other end of the motor coil La is connected to a second output terminal (at which an A-phase output signal AO− appears) of the feed motor driver 2a. One end of the motor coil Lb is connected to a first output terminal (at which a B-phase output signal BO+ appears) of the feed motor driver 2b. The other end of the motor coil Lb is connected to a second output terminal (at which a B-phase output signal BO− appears) of the feed motor driver 2b.

The input signal generating circuit 1a serves as means for generating an A-phase input signal AI having a sinusoidal waveform and then feeding it to the feed motor driver 2a and to the magnetic polarity change detecting circuit 3a. The input signal generating circuit 1b serves as means for generating a B-phase input signal BI having a sinusoidal waveform and then feeding it to the feed motor driver 2b and to the magnetic polarity change detecting circuit 3b. The A-phase input signal AI and the B-phase input signal BI are 90-degrees out of phase with each other. The input signal generating circuits 1a and 1b are also provided with a function of suspending the generation of the input signals AI and BI according to a detection result signal S4, and this function will be described in detail later.

The feed motor driver 2a serves as means for generating, based on the A-phase input signal AI, A-phase output signals AO+ and AO− having a square waveform and then feeding them across the motor coil La. The feed motor driver 2b serves as means for generating, based on the B-phase input signal BI, B-phase output signals BO+ and BO− having a square waveform and then feeding them across the motor coil Lb. For the driving of the feed motor M, the A-phase output signals AO+ and AO− and the B-phase output signals BO+ and BO− have their low-level and high-level periods controlled on a PWM (pulse-width modulation) basis. The feed motor drivers 2a and 2b are also provided with functions of turning the output signal of each phase into a high-impedance state and suspending (or thinning out) the PWM control according to driver control signals S2a and S2b, and these functions will be described in detail later.

The magnetic polarity change detecting circuit 3a serves as means for monitoring the A-phase input signal AI to produce a magnetic polarity change detection signal S1a and then feeding it to the driven/non-driven checking circuit 5. The magnetic polarity change detecting circuit 3b serves as means for monitoring the B-phase input signal BI to produce a magnetic polarity change detection signal S1b and then feeding it to the driven/non-driven checking circuit 5. The magnetic polarity change detecting circuits 3a and 3b are for producing trigger pulses in the magnetic polarity change detection signals S1a and S1b near where the feed motor M changes magnetic polarities, and are built with, for example, a window comparator having predetermined threshold levels (for example, ±20 mV) in both the positive and negative directions.

The back-electromotive voltage detecting circuit 4a serves as means for detecting an A-phase back-electromotive voltage AE from the A-phase output signals AO+ and AO− at the time points specified by a back-electromotive voltage detection control signal S3a and then feeding it to the driven/non-driven checking circuit 5. The back-electromotive voltage detecting circuit 4b serves as means for detecting a B-phase back-electromotive voltage BE from the B-phase output signals BO+ and BO− at the time points specified by a back-electromotive voltage detection control signal S3b and then feeding it to the driven/non-driven checking circuit 5.

The driven/non-driven checking circuit 5 serves as means for checking whether the feed motor M is in a driven state or in a non-driven state based on the levels of the A-phase and B-phase back-electromotive voltages AE and BE and then feeding the check result, as a detection result signal S4, to the input signal generating circuits 1a and 1b. The driven/non-driven checking circuit 5 also serves as means for generating driver control signals S2a and S2b and back-electromotive voltage detection control signals S3a and S3b based on the magnetic polarity change detection signals S1a and S1b.

Next, the operation of lock detection on the feed motor M will be described in detail with reference to FIG. 2.

Figure 2:
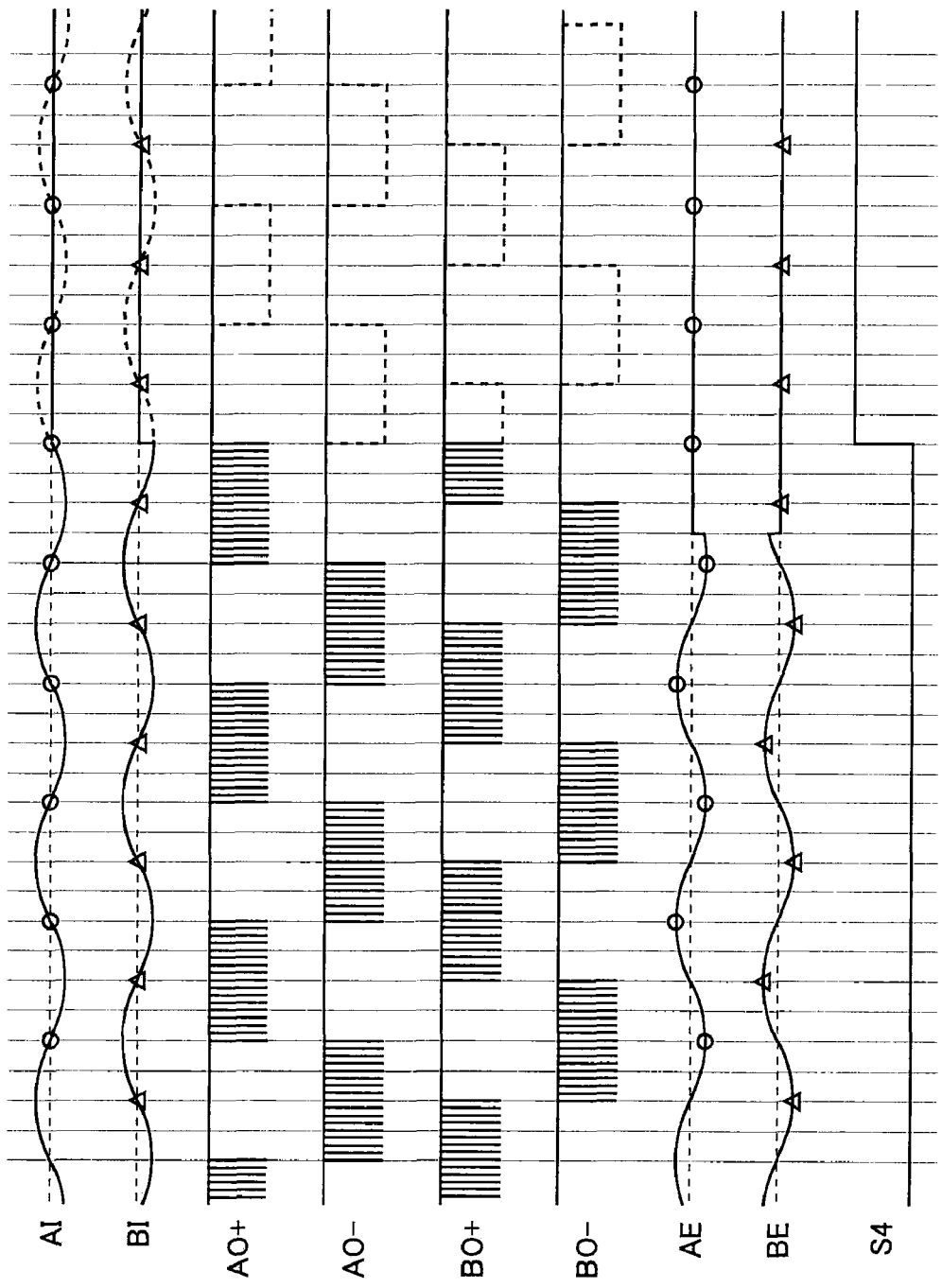
FIG. 2 is a diagram illustrating the operation of lock detection on a feed motor M.

FIG. 2 is a diagram illustrating the operation of lock detection on the feed motor M, and shows, from top, the voltage waveforms of the A-phase input signal AI, the B-phase input signal BI, the A-phase output signals AO+ and AO−, the B-phase output signals BO+ and BO−, the A-phase back-electromotive voltage AE, the B-phase back-electromotive voltage BE, and the detection result signal S4. In reality, the back-electromotive voltages AE and BE cannot be observed by themselves because they are concealed in the PWM control of the driver outputs; in FIG. 2, their respective voltage waveforms are conceptually presented on the assumption that the driver outputs are always in a high-impedance state.

For lock detection on the feed motor M, the magnetic polarity change detecting circuits 3a and 3b monitor the A-phase and B-phase input signals AI and BI respectively, and produce trigger pulses in the magnetic polarity change detection signals S1a and S1b near where the feed motor M changes magnetic polarities (indicated by circular signs for A-phase and triangular signs for B-phase).

Near where the feed motor M changes magnetic polarities (where the relevant back-electromotive voltage becomes highest), to enable detection of the back-electromotive voltage in the phase related to the change in magnetic polarity, the driven/non-driven checking circuit 5 generates, based on the magnetic polarity change detection signals S1a and S1b, the back-electromotive voltage detection control signals S3a and S3b.

More specifically, when a trigger pulse appears in the magnetic polarity change detection signal S1a, the driver control signal S2a is generated such that, for a predetermined period starting at that time point, the A-phase output signals AO+ and AO− are kept in a high-impedance state, and the back-electromotive voltage detection control signal S3a is generated such that, within that predetermined period, the A-phase back-electromotive voltage AE is detected at a predetermined time point. On the other hand, when a trigger pulse appears in the magnetic polarity change detection signal S1b, the driver control signal S2b is generated such that, for a predetermined period starting at that time point, the B-phase output signals BO+ and BO− are kept in a high-impedance state, and the back-electromotive voltage detection control signal S3b is generated such that, within that predetermined period, the B-phase back-electromotive voltage BE is detected at a predetermined time point.

Preferably, the predetermined period mentioned above is set, within the circuit, to be the period that is required for the inductances of the motor coils La and Lb to stabilize (for example, several hundred microseconds, though greatly varying depending on the motor coils La and Lb).

Exploiting the fact that the back-electromotive voltages become almost zero when the feed motor M is in a non-driven state, the driven/non-driven checking circuit 5 checks, based on the detected levels of the back-electromotive voltages, whether the feed motor M is in a driven state (in which the back-electromotive voltages are higher than a predetermined level) or in a non-driven state (in which the back-electromotive voltages are lower than the predetermined level, and feeds the check result, as the detection result signal S4, to the input signal generating circuits 1a and 1b. For example, if the feed motor M is recognized to be in a driven state, the detection result signal S4 is turned to a low level and if the feed motor M is recognized to be in a not driven state, the detection result signal S4 is turned to a high level.

In the driven/non-driven checking circuit 5, preferably, the threshold level with which the back-electromotive voltages are compared is made variable. With this configuration, it is possible to cope with variations in characteristics (drops in torque ascribable to motor characteristics) among individual feed motors M.

On receiving, as the detection result signal S4, a logic level indicating that the feed motor M is in a non-driven state (in the above example, a high level), the input signal generating circuits 1a and 1b suspend the generation of the A-phase and B-phase input signals AI and BI.

As described above, the lock detection device for a feed motor M according to the invention is so configured as to detect a back-electromotive voltage in the feed motor M and check whether the feed motor M is in a driven state or in a non-driven state based on the level of the back-electromotive voltage. With this configuration, compared with conventional configurations employing a mechanical switch or a photosensor switch, it is possible to achieve reduced component costs and reduced size of a product's circuit board. In addition, there is no need to pay extra attention to a mechanical switch, a photosensor switch, or any other additional components, and this makes it extremely easy to attain desired settings.

Moreover, the lock detection device for a feed motor M according to the invention is so configured as to detect a back-electromotive voltage near where the feed motor M changes magnetic polarities. With this configuration, where only the back-electromotive voltage of the phase related to a given change in magnetic polarity is dealt with as the target of detection, it is possible to leave the drive currents of the device unaffected, and thus to detect the back-electromotive voltage without producing unnecessary driving noise.

Near where a change occurs in magnetic polarity, if, during the period in which the A-phase output signals AO+ and AO− are kept in a high-impedance state, the PWM control of the B-phase output signals BO+ and BO− is continued, the A-phase output signals AO+ and AO− become unstable under the influence of the PWM control, lowering the detection accuracy of the A-phase back-electromotive voltage AE. Reversely, if, during the period in which the B-phase output signals BO+ and BO− are kept in a high-impedance state, the PWM control of the A-phase output signals AO+ and AO− is continued, the B-phase output signals BO+ and BO− become unstable under the influence of the PWM control, lowering the detection accuracy of the B-phase back-electromotive voltage BE.

To avoid this inconvenience, the lock detection device for a feed motor M according to the invention is also so configured as to stabilize, when detecting a back-electromotive voltage from one phase output, another phase output.

More specifically, when the A-phase back-electromotive voltage AE is detected, the driven/non-driven checking circuit 5 feeds the feed motor driver 2b with the driver control signal S2b such that the PWM control of the B-phase output signals BO+ and BO− is suspended temporarily at the moment of the detection of the A-phase back-electromotive voltage AE. Reversely, when the B-phase back-electromotive voltage BE is detected, the driven/non-driven checking circuit 5 feeds the feed motor driver 2a with the driver control signal S2a such that the PWM control of the A-phase output signals AO+ and AO− is suspended temporarily at the moment of the detection of the B-phase back-electromotive voltage BE.

The suspension of PWM control can be achieved by thinning out the PWM pulses in the relevant phase output or by SB (shorting to VCC or GND).

Figure 3:
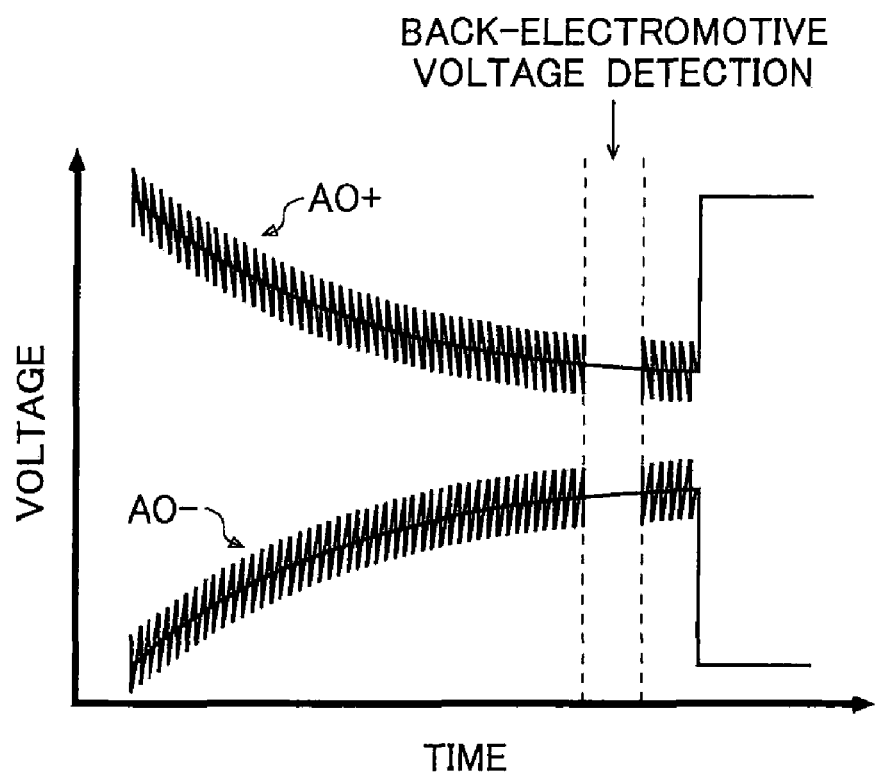
FIG. 3 is a diagram illustrating the control of PWM suppression at the moment of detection of a back-electromotive voltage.

FIG. 3 is a diagram illustrating the control of PWM suspension at the moment of detection of a back-electromotive voltage, and shows an example of the behavior of the A-phase output signals AO+ and AO−.

With this configuration, it is possible to detect a back-electromotive voltage stably without being affected by PWM control, and thus to prevent erroneous detection of driven and non-driven states.

Figure 4:
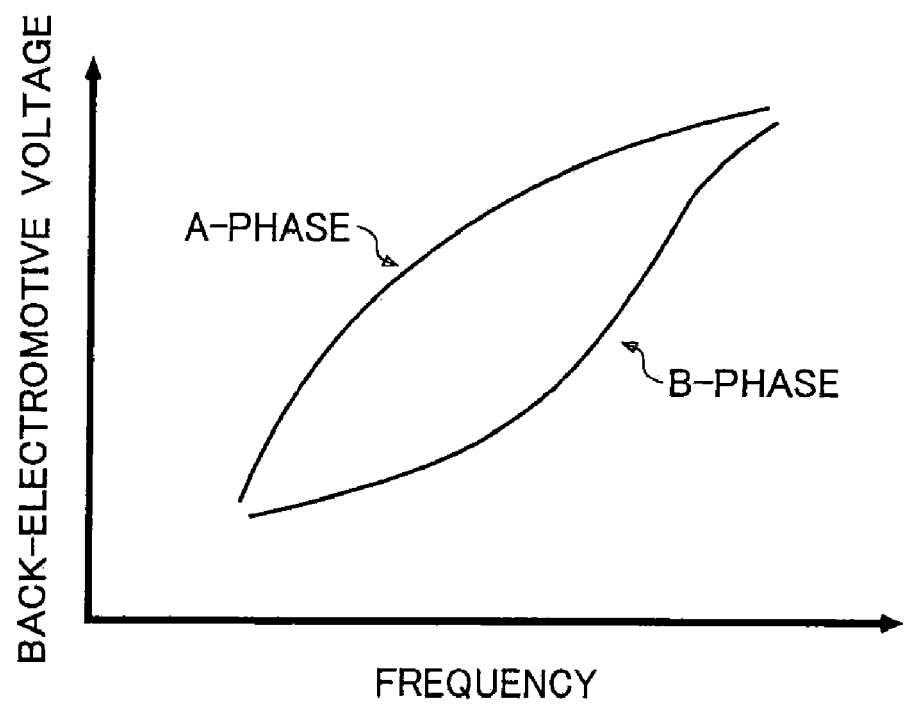
FIG. 4 is a diagram showing an example of motor characteristics.

On the other hand, due to manufacturing variations among individual feed motors M or the like, a feed motor M, although being driven, may not produce a sufficient back-electromotive voltage in one phase (the B-phase in FIG. 4) at low frequencies as shown in FIG. 4.

To avoid this inconvenience, the lock detection device for a feed motor M according to the invention is also so configured as to detect back-electromotive voltages from a plurality of phase outputs and recognize the feed motor M to be in a non-driven state when the back-electromotive voltages of all phases are lower than a predetermined level.

More specifically, when both of the back-electromotive voltages AE and BE are found to be lower than the predetermined level, the driven/non-driven checking circuit 5 recognizes the feed motor M to be in a non-driven state, and turns the detection result signal S4 from a low level to a high level (see FIG. 2).

With this configuration, it is possible to prevent erroneous detection of driven and non-driven states without being affected by variations in characteristics (drops in torque ascribable to motor characteristics) among individual motors. This, however, is in no way meant to limit how the invention is implemented; in cases where higher priority is placed on reducing the stress on the feed motor M, the feed motor M may be recognized to be in a non-driven state and be stopped as soon as the back-electromotive voltage of one phase is found to be lower than the predetermined level.

Figure 5A:
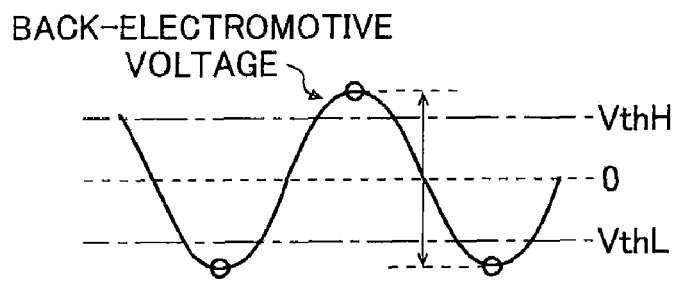
FIGS. 5A and 5B are diagrams contrasting the control of lock detection on a feed motor according to the invention with the control of rotation rate detection on a spindle motor as conventionally practiced, FIG. 5A showing the former and FIG. 5B the latter.

As has been described in detail heretofore, the lock detection device for a feed motor M according to the invention is so configured as to detect a back-electromotive voltage that appears as the feed motor M rotates and check whether the feed motor M is in a driven state or in a non-driven state based on the level of the back-electromotive voltage as shown in FIG. 5A.

Figure 5B:
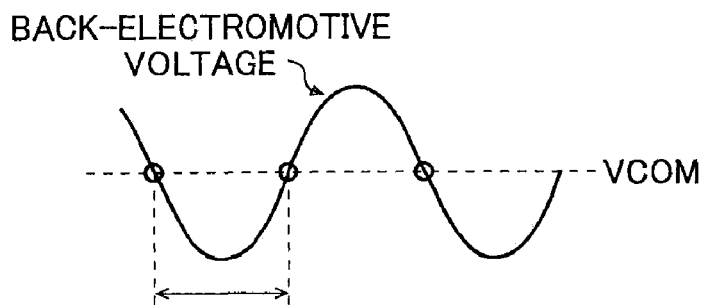
Figure 6:
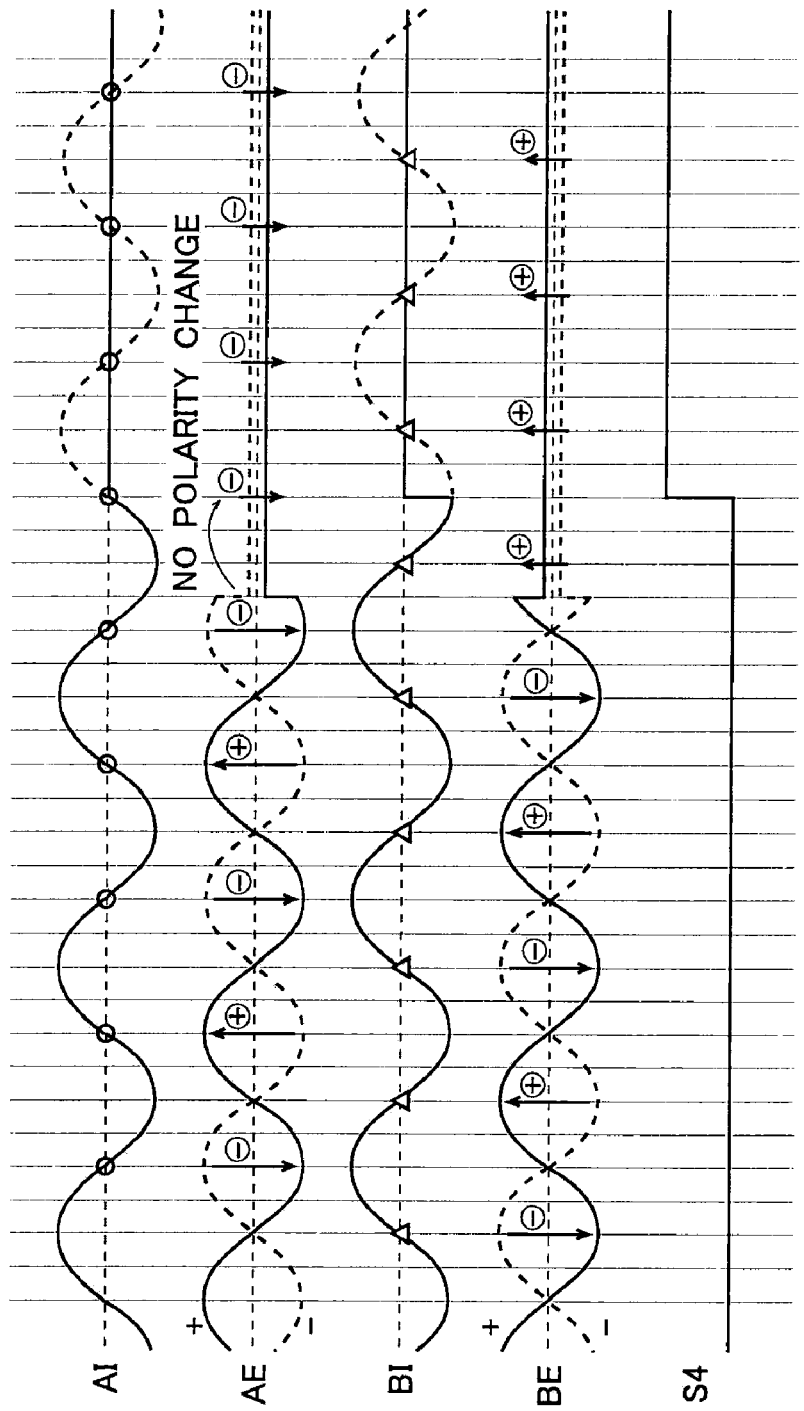
FIG. 6 is a diagram illustrating another example of the operation of lock detection on a feed motor M.

According to a conventionally known technology, as shown in FIG. 5B, a torque commensurate with an input is fed to a spindle motor, and the back-electromotive voltage that appears as the spindle motor rotates is compared with the common terminal voltage to measure the time intervals at which the back-electromotive voltage crosses the common terminal voltage so that, based on the time intervals, the rotation rate of the spindle motor is detected. The only common feature between the invention and this conventional technology is the detection of a back-electromotive voltage in a motor; thus, clearly, they are distinct from each other in basic design.

The invention may be carried out in any manner other than specifically described by way of an embodiment above, with any modification or variation made without departure from the spirit of the invention.

For example, although the above embodiment deals with, as an example, a configuration employing a two-phase feed motor M, this is in no way meant to limit how the invention is implemented; instead, it is possible to use a single-phase feed motor, or a three-, four-, . . . , or n-phase (where n≧2) feed motor.

Although the above embodiment deals with, as an example, a configuration in which a back-electromotive voltage that appears as the feed motor M rotates is detected and, based on its level, whether the feed motor M is in a driven state or in a non-driven state is checked, this is in no way meant to limit how the invention is implemented; instead, it is possible to check whether the feed motor M is in a driven state or in a non-driven state based on whether a polarity change has occurred in the A-phase back-electromotive voltage AE (or the B-phase back-electromotive voltage BE) every time the A-phase back-electromotive voltage AE (or the B-phase back-electromotive voltage BE) is detected (in other words, whether or not the levels of the A-phase positive and negative back-electromotive voltage AE+ and AE− relative to each other (or the levels of the B-phase positive and negative back-electromotive voltage BE+ and BE− relative to each other) have reversed or not).

Figure 7:
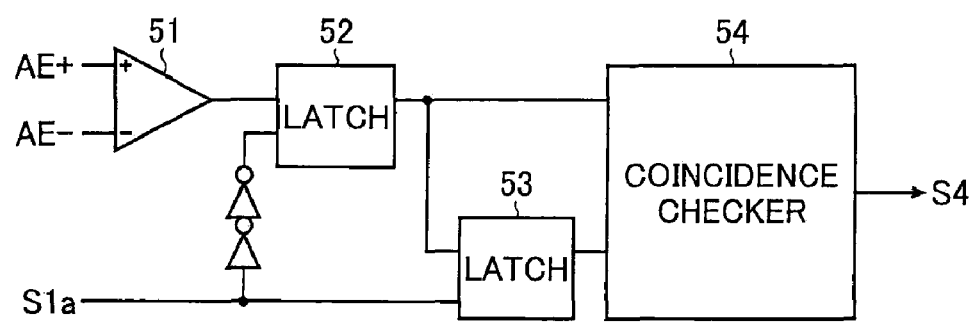
FIG. 7 is a block diagram showing an example of the configuration of a driven/non-driven checking circuit 5.

FIG. 7 is a block diagram showing an example of the configuration of the driven/non-driven checking circuit 5.

As shown in FIG. 7, the driven/non-driven checking circuit 5 of this example is composed of: a comparator 51 that checks the polarity (+/−) of the A-phase back-electromotive voltage AE; a first latch 52 that holds the output signal of the comparator 51 when triggered by the magnetic polarity change detection signal S1a (more precisely, a delayed version of the magnetic polarity change detection signal S1a), the first latch 52 thus serving as means for holding the logic signal indicating the polarity of the A-phase back-electromotive voltage AE as detected at the current moment of detection; a second latch 53 that holds the output signal of the first latch 52 when triggered by the magnetic polarity change detection signal S1a, the second latch 53 thus serving as means for holding the logic signal indicating the polarity of the A-phase back-electromotive voltage AE as detected at the previous moment of detection; and a coincidence checker 54 that checks whether or not the output logic levels of the first and second latches 52 and 53 coincide.

With this configuration, it is possible to prevent erroneous detection, and to cope with variations in characteristics (drops in torque ascribable to motor characteristics) among individual feed motors M.

Figure 8:
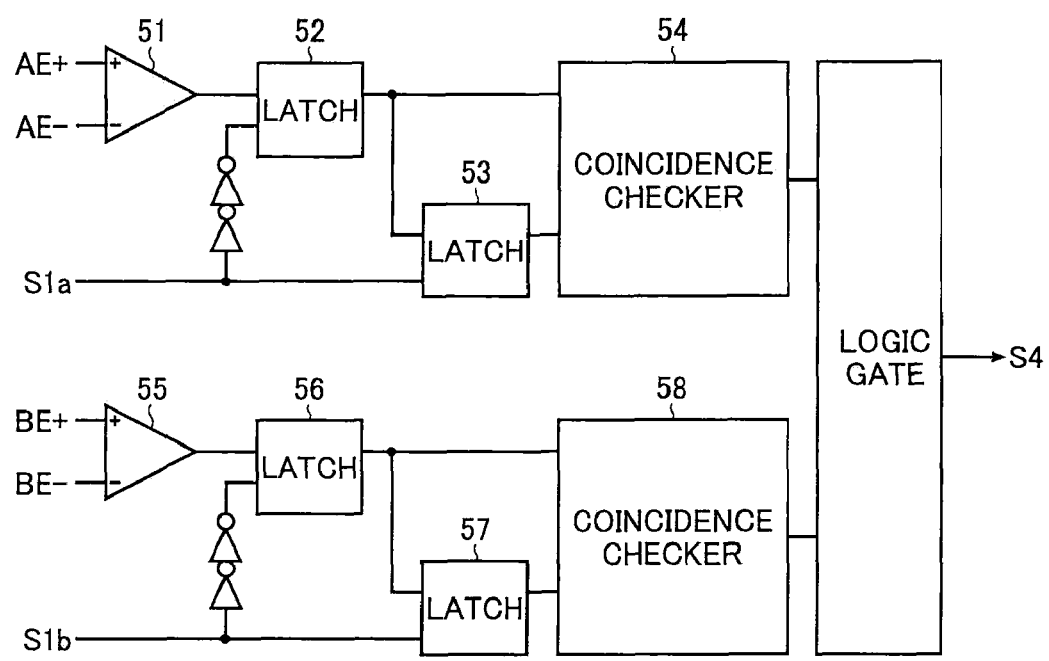
FIG. 8 is a block diagram showing another example of the configuration of a driven/non-driven checking circuit 5.

Although FIG. 7 shows, as an example, a configuration in which only the A-phase back-electromotive voltage AE is monitored, this is in no way meant to limit how the invention is implemented; it is possible, as shown in FIG. 8, to monitor also the B-phase back-electromotive voltage BE to check whether or not a polarity change has occurred in the B-phase back-electromotive voltage BE every time it is detected so that, based on the check results on both the A and B phases, whether the feed motor M is in a driven state or in a non-driven state is checked.

In that case, the feed motor M may be recognized to be in a non-driven state only when it is found that no polarity change has occurred in either of the A and B phases. Alternatively, the feed motor M may be recognized to be in a non-driven state as soon as it is found that a polarity change has occurred in either of the A and B phases.

It is preferable that the comparators 51 and 55 that respectively check the polarity of the back-electromotive voltages AE and BE be given an offset in their threshold levels so that they can correctly check the polarity of the back-electromotive voltages AE and BE even when these voltages chatter after the feed motor M has entered a non-driven state.

As described above, according to the invention, it is possible to detect whether a feed motor is in a driven state or in a non-driven state with no increase in component costs or in the size of a product's circuit board.

In terms of industrial applicability, the invention is useful in products employing a feed motor in general, such as DVD drive apparatuses, CD drive apparatuses, Blu-ray disc drive apparatuses, car audio products, and camcorders, and finds application, for example, in an optical disk apparatus, as means for detecting a pickup having reached a movement limit position (the innermost or outermost edge of an optical disc) with the eventual aim to stop a feed motor.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:
1. A lock detection device for checking whether a feed motor is in a driven state or in a non-driven state, the feed motor including an A-phase coil driven by an A-phase motor driver and a B-phase coil driven by a B-phase motor driver, the lock detection device comprising:

an A-phase magnetic polarity change detector arranged to generate an A-phase magnetic polarity change detection signal according to a change in A-phase magnetic polarity of the feed motor;
a B-phase magnetic polarity change detector arranged to generate a B-phase magnetic polarity change detection signal according to a change in B-phase magnetic polarity of the feed motor;
an A-phase back electromotive voltage detector arranged to detect an A-phase back electromotive voltage appearing in the A-phase coil;
a B-phase back electromotive voltage detector arranged to detect a B-phase back electromotive voltage appearing in the B-phase coil;
a checker arranged to recognize the feed motor to be in the driven state when at least one of the A- and B-phase back electromotive voltages is higher than a predetermined level and recognize the feed motor to be in the non-driven state when both the A- and B-phase back electromotive voltages are lower than the predetermined level;
an A-phase driver control signal generator arranged to generate and feed to the A-phase motor driver an A-phase driver control signal based on the A-phase magnetic polarity change detection signal such that both ends of the A-phase coil are turned into a high-impedance state near a change in A-phase magnetic polarity; and
a B-phase driver control signal generator arranged to generate and feed to the B-phase motor driver a B-phase driver control signal based on the B-phase magnetic polarity change detection signal such that both ends of the B-phase coil are turned into a high-impedance state near a change in B-phase magnetic polarity,
wherein:
the A-phase driver control signal generator generates and feeds to the A-phase motor driver the A-phase driver control signal such that the A-phase coil stops being driven when both ends of the B-phase coil are in a high-impedance state,
the B-phase driver control signal generator generates and feeds to the B-phase motor driver the B-phase driver control signal such that the B-phase coil stops being driven when both ends of the A-phase coil are in a high-impedance state,
the A-phase back electromotive voltage detector detects the A-phase back electromotive voltage when both ends of the A-phase coil are in a high-impedance state, and
the B-phase back electromotive voltage detector detects the B-phase back electromotive voltage when both ends of the B-phase coil are in a high-impedance state.

2. The lock detection device according to claim 1, wherein the predetermined level, with which each of the A- and B-phase back-electromotive voltages is compared to check whether the feed motor is in the driven state or in the non-driven state, is variable.

3. A lock detection device comprising:
a comparator arranged to compare a back electromotive voltage in a feed motor with an inverted signal of the back electromotive voltage and to output a comparison signal according to polarity of the back electromotive voltage;
a magnetic polarity change detector arranged to generate a magnetic polarity change detection signal according to a change in magnetic polarity of the feed motor;
a first latch arranged to hold the comparison signal fed thereto at a kth detection timing (where $k \geq 2$), k being determined based on the magnetic polarity change detection signal;

a second latch arranged to hold the comparison signal fed to the first latch at a (k−1)th detection timing, (k−1) being determined based on the magnetic polarity change detection signal; and an agreement checker arranged to check whether or not output logic levels of the first and second latches agree with one another.

4. The lock detection device according to claim 3 wherein the comparator, the magnetic polarity change detector, the first latch, the second latch, and the agreement checker are provided each in a number equal to a number of phases of the feed motor, and the lock detection device checks, based on a result of the agreement check in each phase, whether or not there is a change in the back electromotive voltage of each phase and, based on a result of this check, determines whether the feed motor is in the driven state or in the non-driven state.

5. The lock detection device according to claim 4, wherein the lock detection device recognizes the feed motor to be in the non-driven state when no polarity change has occurred in the back-electromotive voltage of any phase.

6. The lock detection device according to claim 4, wherein the lock detection device recognizes the feed motor to be in the non-driven state when no polarity change has occurred in the back-electromotive voltage of at least one phase.

* * * * *